(12) United States Patent
Kim et al.

(10) Patent No.: US 12,411,273 B2
(45) Date of Patent: Sep. 9, 2025

(54) COLOR CONVERSION PANEL AND DISPLAY DEVICE INCLUDING THE SAME

(71) Applicant: Samsung Display Co., LTD., Yongin-si (KR)

(72) Inventors: Jeong Ki Kim, Hwaseong-si (KR); Hwa Yeul Oh, Hwaseong-si (KR); Yeo Geon Yoon, Seoul (KR); Jong-Hoon Kim, Seoul (KR); Seong Yeon Lee, Anyang-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 630 days.

(21) Appl. No.: 17/579,454

(22) Filed: Jan. 19, 2022

(65) Prior Publication Data

US 2022/0229214 A1 Jul. 21, 2022

(30) Foreign Application Priority Data

Jan. 20, 2021 (KR) .......................... 10-2021-0008133

(51) Int. Cl.
*G02B 5/20* (2006.01)

(52) U.S. Cl.
CPC .................................. *G02B 5/201* (2013.01)

(58) Field of Classification Search
CPC ........ G02B 5/201; G02B 5/20; G02B 6/0026; H01L 27/156; H01L 33/508; H10K 59/38; H10K 59/12
See application file for complete search history.

(56) References Cited

U.S. PATENT DOCUMENTS

| 6,858,898 B1* | 2/2005 | Hayakawa ........ H01L 21/02532 |
| | | 257/E27.111 |
| 6,940,124 B2* | 9/2005 | Kitakado ............... H10D 86/60 |
| | | 257/E27.111 |
| 7,815,983 B2 | 10/2010 | Iwanaga |
| 10,249,689 B2 | 4/2019 | Kim et al. |
| 10,903,446 B2 | 1/2021 | Son et al. |

(Continued)

FOREIGN PATENT DOCUMENTS

| JP | 4717674 | 7/2011 |
| KR | 20180002933 A | 1/2018 |

(Continued)

OTHER PUBLICATIONS

Jacob, A. P., et al. "Hydrogen Passivation of Self Assembled Inas Quantum Dots." Journal of Applied Physics, vol. 92, No. 11, 2002, pp. 6794-6798.

*Primary Examiner* — Pinping Sun
*Assistant Examiner* — Gabriel A Sanz
(74) *Attorney, Agent, or Firm* — CANTOR COLBURN LLP

(57) ABSTRACT

A color conversion panel including: a first substrate; light blocking members disposed on the first substrate while being separated from each other; a first color conversion layer, a second color conversion layer, and a transmissive layer that are respectively disposed between the light blocking members; and a capping layer disposed on the first color conversion layer, the second color conversion layer, and the transmissive layer. The capping layer is a multi-layer structure containing SiON having different compositions.

14 Claims, 3 Drawing Sheets

(56) References Cited

U.S. PATENT DOCUMENTS

| | | | |
|---|---|---|---|
| 2001/0011725 A1* | 8/2001 | Sakama | H10D 30/0314 |
| | | | 438/149 |
| 2003/0186489 A1* | 10/2003 | Ishikawa | H01L 27/1248 |
| | | | 257/E27.113 |
| 2005/0073243 A1* | 4/2005 | Yamazaki | H10K 59/122 |
| | | | 313/498 |
| 2018/0006093 A1* | 1/2018 | Kim | G03F 7/0007 |
| 2018/0156951 A1* | 6/2018 | Baek | G02F 1/133617 |
| 2019/0079341 A1 | 3/2019 | Lee | |
| 2019/0310522 A1 | 10/2019 | Chu et al. | |
| 2019/0378881 A1* | 12/2019 | Kim | G02F 1/133617 |
| 2021/0103079 A1 | 4/2021 | Lee et al. | |

FOREIGN PATENT DOCUMENTS

| | | |
|---|---|---|
| KR | 1020190029845 A | 3/2019 |
| KR | 1020190118224 A | 10/2019 |
| KR | 20200104451 A | 9/2020 |
| KR | 20210041674 A | 4/2021 |

\* cited by examiner

COLOR CONVERSION PANEL AND DISPLAY DEVICE INCLUDING THE SAME

CROSS-REFERENCE TO RELATED APPLICATION

This application claims priority from and the benefit of Korean Patent Application No. 10-2021-0008133, filed on Jan. 20, 2021, which is hereby incorporated by reference for all purposes as if fully set forth herein.

BACKGROUND

Field

Embodiments of the invention relates generally to a color conversion panel and a display device including the same.

Discussion of the Background

A light emitting element is an element in which an exciton is formed by combining a hole supplied from an anode and an electron supplied from a cathode in an emission layer formed between the anode and the cathode, and light is emitted while the exciton is stabilized.

Since light emitting elements have various desirable characteristics, such as a wide viewing angle, fast response speed, a small thickness, and low power consumption, they are widely applied to various electric and electronic devices such as televisions, monitors, and mobile phones.

Recently, a display device including a color conversion panel has been proposed to implement a high-efficiency display device. The color conversion panel converts incident light into different colors. In this case, the light source usually emits blue light, and the blue light is color converted to red and green, respectively, or transmitted as blue light itself.

The above information disclosed in this Background section is only for enhancement of understanding of the background of the invention, and therefore it may contain information that does not form the prior art that is already known in this country to a person of ordinary skill in the art.

SUMMARY

Embodiments of the invention provide a color conversion panel that solves a problem of stain generation while increasing color conversion efficiency, and a display device including the same.

Additional features of the inventive concepts will be set forth in the description which follows, and in part will be apparent from the description, or may be learned by practice of the inventive concepts.

An embodiment of the invention provides a color conversion panel according including: a first substrate; light blocking members that are disposed on the first substrate while being separated from each other; a first color conversion layer, a second color conversion layer, and a transmissive layer that are respectively disposed between the light blocking members; and a capping layer that is disposed on the first color conversion layer, the second color conversion layer, and the transmissive layer. The capping layer is a multi-layer structure containing SiON having different compositions.

The capping layer may include a second layer and a first layer disposed between the second layer and the color conversion layer.

In the first layer, a nitrogen (N) content and an oxygen (O) content may be different from an N content and an O content of the second layer.

The N content of the first layer may be higher than that of the second layer.

The O content of the second layer may be higher than that of the first layer

The first layer may contain SiON with an O/Si molar ratio of 1.0 to 1.2.

The second layer may contain SiON with an O/Si molar ratio of 1.7 to 1.9.

The thickness of the first layer may be less than that of the second layer.

A thickness of the first layer may be 5% to 20% of a thickness of the second layer.

The first layer may be in direct contact with the first color conversion layer, the second color conversion layer, and the transmissive layer.

Another embodiment of the invention provides a display device including: a color conversion panel; and a display panel that is disposed while overlapping the color conversion panel. The color conversion panel includes: a first substrate; light blocking members that are disposed on the first substrate and are separated from each other; a first color conversion layer, a second color conversion layer, and a transmissive layer that are respectively disposed between the light blocking members; and a capping layer that is disposed on the first color conversion layer, the second color conversion layer, and the transmissive layer, and the capping layer has a multi-layered structure including SiON having different compositions.

The capping layer may include a second layer, and a first layer that is disposed between the second layer and the color conversion layer.

A nitrogen (N) content of the first layer may be greater than that of the second layer, and an oxygen (O) content of the second layer may be greater than that of the first layer.

The first layer may include SiON with an O/Si molar ratio of 1.0 to 1.2.

The second layer may include SiON with an O/Si molar ratio of 1.7 to 1.9.

A thickness of the first layer may be 5% to 20% of a thickness of the second layer.

According to the embodiments, the color conversion panel that can solve a problem of stain generation while increasing color conversion efficiency, and the display device including the same can be provided.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate illustrative embodiments of the invention, and together with the description serve to explain the inventive concepts.

DETAILED DESCRIPTION

Figure 1:
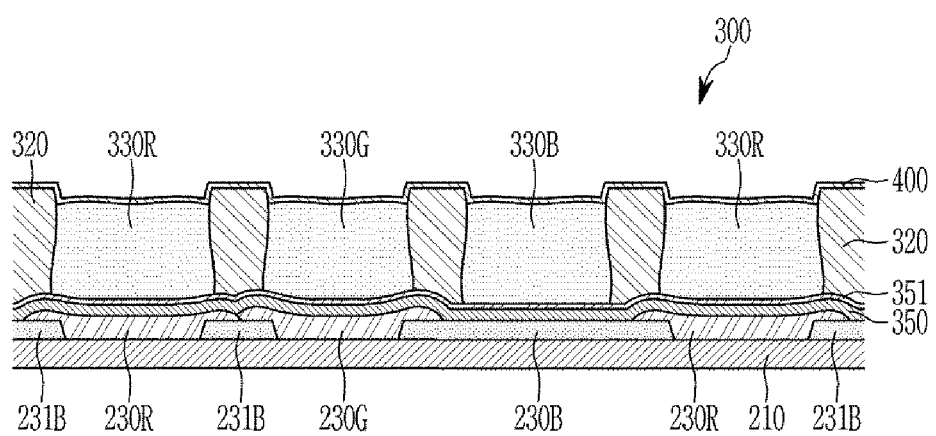
FIG. 1 is a schematic cross-sectional view of a color conversion panel according to an present embodiment.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is a schematic cross-sectional view of a color conversion panel according to the present embodiment.

Referring to FIG. 1, a color conversion panel according to the present embodiment includes a blue color filter 230B disposed on a first substrate 210. A dummy color filter 231B may be disposed in the same layer as the blue color filter 230B. The dummy color filter 231B may be disposed apart from the blue color filter 230B.

A red color filter 230R may be disposed between the dummy color filters 231B. A green color filter 230G may be disposed between the red color filter 230R and the blue color filter 230B.

A low refractive layer 350 and a low refractive capping layer 351 may be disposed on the color filters 230R, 230G, and 230B and the dummy color filter 231B. The low refractive layer 350 may include a material with a low refractive index, and the low refractive capping layer 351 may be disposed on the low refractive layer 350.

Light blocking members 320 are disposed on the low refractive capping layer 351. The light blocking members 320 may be disposed to form openings that overlap the respective color filters 230R, 230G, and 230B in a direction that is perpendicular to a plane of the first substrate 210.

The red color conversion layer 330R, the green color conversion layer 330G, and the transmissive layer 330B are disposed between the light blocking members 320. That is, as shown in FIG. 1, the red color conversion layer 330R, the green color conversion layer 330G, and the transmissive layer 330B may be respectively disposed in spaces partitioned by the light blocking members 320. The capping layer 400 may be disposed on the red color conversion layer 330R, the green color conversion layer 330G, and the transmissive layer 330B.

The capping layer 400 may include SiON. More specifically, the capping layer 400 may have a multi-layered structure including SiON having different compositions. A detailed configuration of the capping layer 400 will be described later.

The light blocking member 320 may include a black material. The red color conversion layer 330R may be disposed while overlapping the red color filter 230R in a direction that is perpendicular to a plane of the first substrate 210, and the green color conversion layer 330G may be disposed while overlapping the red color filter 230G in the direction that is perpendicular to the plane of the first substrate 210. The transmissive layer 330B is located while overlapping the blue color filter 230B in the direction that is perpendicular to the plane of the first substrate 210.

The red color conversion layer 330R may convert supplied blue light to red light. For this, the red color conversion layer 330R may include first quantum dots. The first quantum dots may convert incident blue light to red light. Specifically, a maximum light emission peak wavelength of light emitted by the first quantum dots may be about 600 nm or more, for example, 610 nm or more, 615 nm or more, or 620 nm or more and 650 nm or less, 645 nm or less, 640 nm or less, 635 nm or less, or 630 nm or less.

A diameter of the first quantum dot may be about 5 nm to 6 nm. However, this is just an example, and the inventive concepts are not limited thereto. The content of the first quantum dots in the red color conversion layer 330R layer may be 30 wt % to 50 wt %. The red color conversion layer 330R may further include a scatterer, and the scatterer may be TiO2. The content of TiO2 in the red color conversion layer 330R may be 4 wt % to 5 wt %.

The green color conversion layer 330G may convert the supplied blue light into green light. The green color conversion layer 330G may include second quantum dots. The second quantum dots may convert incident blue light into green light. Specifically, the maximum light emitting peak wavelength of light emitted by the second quantum dots is 480 nm or more, for example, 500 nm or more, 510 nm or more, 520 nm or more, or 530 nm or more and 560 nm or less, 550 nm or less, 545 nm or less, 540 nm or less, or 535 nm or less.

A diameter of the second quantum dot may be 3 nm to 4 nm. However, this is only an example and the inventive concepts are not limited thereto. The content of the second quantum dots in the green color conversion layer 330G may be 30 wt % to 50 wt %. The green color conversion layer 330G may include a scatterer, and the scatterer may be TiO2. The content of TiO2 in the green color conversion layer 330G may be 4 wt % to 5 wt %.

The transmissive layer 330B transmits the incident blue light. The transmissive layer may contain a transparent polymer, and the supplied blue light transmits and expresses blue. The transmissive layer 330B may include a scatterer, and the scatterer may be TiO2. The content of TiO2 in the transmissive layer 330B may be 5 wt % to 6 wt %.

Each of the first quantum dots and second quantum dots of the inventive concepts may have the features described below.

In the inventive concepts, quantum dots (hereinafter, also referred to as semiconductor nanocrystals) may include Group II-VI compounds, Group III-V compounds, Group IV-VI compounds, Group IV elements or compounds, Group I-III-VI compounds, II-III-VI VI compounds, group I-II-IV-VI compounds, or a combination thereof.

The Group II-VI compound may be selected from a group consisting of a binary compound selected from a group consisting of CdSe, CdTe, ZnS, ZnSe, ZnTe, ZnO, HgS, HgSe, HgTe, MgSe, MgS, and a mixture thereof; a three-element compound consisting of AgInS, CuInS, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a mixture thereof; and a four-element compound consisting of HgZnTeS, CdZnSeS, CdZnSeTe, CdZnSTe, CdHgSeS, CdHgSeTe, CdHgSTe, HgZnSeS, HgZnSeTe, HgZnSTe, and a mixture thereof. The Group II-VI compound may further include a Group III metal.

The Group III-V compound may be selected from a group consisting of a binary compound consisting of GaN, GaP, GaAs, GaSb, AlN, AlP, AlAs, AlSb, InN, InP, InAs, InSb, and a mixture thereof; a three-element compound consisting of GaNP, GaNAs, GaNSb, GaPAs, GaPSb, AlNP, AlNAs, AlNSb, AlPAs, AlPSb, InGaP, InNP, InNAs, InNSb, InPAs, InZnP, InPSb, and a mixture thereof; and a four-element compound consisting of GaAlNP, GaAlNAs, GaAlNSb, GaAlPAs, GaAlPSb, GaInNP, GaInNAs, GaInNSb, GaIn-PAs, GaInPSb, InAlNP, InAlNAs, InAlNSb, InAlPAs, InAlPSb, InZnP, and a mixture thereof. The Group III-V compound may further include a Group II metal (e.g., InZnP).

The Group IV-VI compound may be selected from a group consisting of a binary element compound consisting of SnS, SnSe, SnTe, PbS, PbSe, PbTe, and a mixture thereof; a three-element compound consisting of SnSeS, SnSeTe, SnSTe, PbSeS, PbSeTe, PbSTe, SnPbS, SnPbSe, SnPbTe, and a mixture thereof; and a four-element compound consisting of SnPbSSe, SnPbSeTe, SnPbSTe, and a mixture thereof.

The group IV element or compound may be selected from a single element compound selected from a group consisting of Si, Ge, and a binary compound selected from a group consisting of SiC, SiGe, and a combination thereof, but is not limited thereto.

Examples of the Group compound include CuInSe2, CuInS2, CuInGaSe, and CuInGaS, but are not limited thereto. Examples of the I-II-IV-VI group compound include CuZnSnSe, and CuZnSnS, but are not thereto. The group IV element or compound may be selected from a group consisting of a single element selected from a group consisting of Si, Ge, and mixture thereof; and a binary element compound selected from a group consisting of SiC, SiGe, and a mixture thereof.

The Group compound may be selected from a group consisting of ZnGaS, ZnAlS, ZnInS, ZnGaSe, ZnAlSe, ZnInSe, ZnGaTe, ZnAlTe, ZnInTe, ZnGaO, ZnAlO, ZnInO, HgGaS, HgAlS, HgInS, HgGaSe, HgAlSe, HgInSe, HgGaTe, HgAlTe, HgInTe, MgGaS, MgAlS, MgInS, MgGaSe, MgAlSe, MgInSe, and a combination thereof, but not limited thereto.

The Group I-II-IV-VI compound may be selected from CuZnSnSe and CuZnSnS, but is not limited thereto.

In one implementation, the quantum dot may not include cadmium. The quantum dot may include a semiconductor nanocrystal based on the Group III-V compounds including indium and phosphorus. The Group III-V compound may further contain zinc. The quantum dot may include a semiconductor nanocrystal based on a Group II-VI compound including a chalcogen element (e.g., sulfur, selenium, tellurium, or a combination thereof) and zinc.

In the quantum dot, the two-element compound, the three-element compound, and/or the four-element compound described above may exist in a particle with a uniform concentration, or may exist in the same particle as the concentration distribution is partially divided into different states. In addition, one quantum dot may have a core/shell structure surrounding another quantum dot. The interface between the core and the shell may have a concentration gradient that decreases toward the center of the concentration of elements present in the shell.

In some embodiments, the quantum dot may have a core-shell structure that includes a core including the aforementioned nanocrystal and a shell surrounding the core. The shell of the quantum dot may serve as a protective layer to maintain semiconductor characteristics by preventing chemical degeneration of the core and/or as a charging layer to impart electrophoretic characteristics to the quantum dot. The shell may be single-layered or multi-layered. The interface between the core and the shell may have a concentration gradient that decreases toward the center of the concentration of elements present in the shell. Examples of the quantum dot shell include a metal or a non-metal oxide, a semiconductor compound, or a combination thereof.

For example, the metal or the non-metal oxide may be a binary element compound, such as $SiO_2$, $Al_2O_3$, $TiO_2$, ZnO, MnO, $Mn_2O_3$, $Mn_3O_4$, CuO, FeO, $Fe_2O_3$, $Fe_3O_4$, CoO, $Co_3O_4$, NiO, and the like, or a three-element compound such as $MgAl_2O_4$, $CoFe_2O_4$, $NiFe_2O_4$, $CoMn_2O_4$, and the like, but the present invention is not limited thereto.

In addition, the semiconductor compound may be, for example, CdS, CdSe, CdTe, ZnS, ZnSe, ZnTe, ZnSeS, ZnTeS, GaAs, GaP, GaSb, HgS, HgSe, HgTe, InAs, InP, InGaP, InSb, AlAs, AlP, AlSb, and the like, but the present invention is not limited thereto.

The interface between the core and the shell may have a concentration gradient that decreases toward the center of the concentration of elements present in the shell. In addition, the semiconductor nanocrystal may have a structure including one semiconductor nanocrystal core and a multi-layered shell surrounding the semiconductor nanocrystal core. In one embodiment, the multi-layered shell may have two or more layers, for example, two, three, four, five, or more layers. The two adjacent layers of the shell may have a single composition or different compositions. In a multi-layered shell, each layer may have a composition that varies along the radius.

Quantum dots may have a full width at half maximum (FWHM) of a light emitting wavelength spectrum of about 45 nm or less, preferably about 40 nm or less, and more preferably about 30 nm or less, and color purity or color reproducibility in this range can be improved. In addition, since the light emitted through the quantum dot is emitted in all directions, the optical viewing angle can be improved.

In the quantum dot, a shell material and a core material may have different energy bandgaps. For example, the energy bandgap of the shell material may be larger than that of the core material. In other embodiments, the energy bandgap of the shell material may be smaller than that of the core material. The quantum dot may have a multi-layered shell. In a multi-layered shell, the energy bandgap of the outer layer may be larger than that of the inner layer (i.e., a layer closer to the core). In a multi-layered shell, the energy bandgap of the outer layer may be smaller than that of the inner layer.

Quantum dots may control absorption/light emitting wavelength by adjusting composition and size thereof. The maximum light emitting peak wavelength of a quantum dot may have a wavelength range from an ultraviolet (UV) to infrared wavelength or higher.

A quantum dot may have quantum efficiency of about 10% or more, for example, about 30% or more, about 50% or more, about 60% or more, about 70% or more, about 90% or more, or even 100%. The quantum dot may have a relatively narrow spectrum. The quantum dot may have a half width of a light emitting wavelength spectrum of, for example, about 50 nm or less, for example, about 45 nm or less, about 40 nm or less, or about 30 nm or less.

The quantum dot may have a particle size of about 1 nm or more and about 100 nm or less. The particle size refers to a diameter of the particle or a diameter converted by assuming a sphere from a 2D image obtained by analysis by a transmission electron microscope. The quantum dot may have a size of about 1 nm to about 20 nm, for example, 2 nm or more, 3 nm or more, or 4 nm or more and 50 nm or less, 40 nm or less, 30 nm or less, 20 nm or less, 15 nm or less, or, 10 nm or less. The shape of the quantum dot is not particularly limited. For example, the shape of the quantum dot may include a sphere, a polyhedron, a pyramid, a multipod, a square, a rectangular parallelepiped, a nanotube, a nanorod, a nanowire, a nanosheet, or a combination thereof, but is not limited thereto.

Quantum dots are commercially available or can be synthesized appropriately. Particle size of the quantum dot can be controlled relatively freely and uniformly during colloid synthesis.

The quantum dot may contain an organic ligand (e.g., having a hydrophobic moiety and/or a hydrophilic moiety). The organic ligand moiety may be bound to the surface of the quantum dot. The organic ligands include RCOOH, $RNH_2$, $R_2NH$, $R_3N$, RSH, $R_3PO$, $R_3P$, ROH, RCOOR, $RPO(OH)_2$, RHPOOH, $R_2POOH$, or a combination thereof, where each R may independently be a C3 to C40 (e.g., C5 or more and C24 or less) substituted or unsubstituted alkyl, substituted or unsubstituted alkenyl, and the like, a C3 to C40 substituted or unsubstituted aliphatic hydrocarbon group, a substituted or unsubstituted C6 to C40 aryl group, and the like, a C6 to C40 substituted or unsubstituted aromatic hydrocarbon group (e.g. C6 or more and C20 or less), or a combination thereof.

The organic ligand may for example include: thiol compounds, such as methane thiol, ethane thiol, propane thiol, butane thiol, pentane thiol, hexane thiol, octane thiol, dodecane thiol, hexadecane thiol, octadecane thiol, and benzyl thiol; amines, such as methane amine, ethane amine, propane amine, butane amine, pentyl amine, hexyl amine, octyl amine, nonyl amine, decyl amine, dodecyl amine, hexadecyl amine, octadecyl amine, dimethyl amine, diethyl amine, dipropyl amine, tributylamine, and trioctylamine; carboxylic acid compounds, such as methanic acid, ethanic acid, propane acid, butanoic acid, pentanoic acid, hexanoic acid, heptanoic acid, octanoic acid, dodecanoic acid, hexadecanoic acid, octadecanoic acid, oleic acid, and benzoic acid; phosphine compounds, such as methyl phosphine, ethyl phosphine, propyl phosphine, butyl phosphine, pentyl phosphine, octyl phosphine, dioctyl phosphine, tributyl phosphine, trioctyl phosphine, and the like; phosphines, such as methyl phosphine oxide, ethyl phosphine oxide, propyl phosphine oxide, butyl phosphine oxide, pentyl phosphine oxide, tributyl phosphine oxide, octyl phosphine oxide, dioctyl phosphine oxide, trioctyl phosphine oxide, and a compound or oxide compound thereof; a diphenyl phosphate spin, a triphenyl phosphate spin compound or its oxide compound; a C5 to C20 alkyl phosphinic acid or a C5 to C20 alkyl phosphonic acid, such as hexylphosphinic acid, octylphosphinic acid, dodecanephosphinic acid, tetradecanfosphinic acid, hexadecanphosphinic acid, octadecanphosphinic acid; and the like, but are not limited thereto. Quantum dots may contain hydrophobic organic ligands alone or as a mixture of more than one. The hydrophobic organic ligand (e.g., acrylate group, methacrylate group, and the like) may not contain a photopolymerizable moiety.

Figure 2:
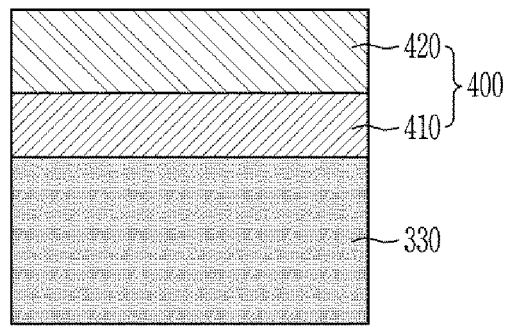
FIG. 2 illustrates some of the color conversion layer and the capping layer in FIG. 1 in detail.

Hereinafter, the capping layer 400 of the color conversion panel according to the embodiment of the present invention will be described with reference to FIG. 2. FIG. 2 illustrates in further detail a portion of the color conversion layer 330 and the capping layer 400 illustrated in FIG. 1.

Referring to FIG. 2, the capping layer 400 of the color conversion panel according to the present embodiment includes a first layer 410 and a second layer 420.

The first layer 410 is disposed between the second layer 420 and the color conversion layer 330, and may directly contact the color conversion layer 330. The second layer 420 may not directly contact the color conversion layer 330, and is located in the outermost side of the color conversion panel 300.

The first layer 410 may include N-rich SiON. Specifically, the first layer may include SiON having an O/Si molar ratio of 1.0 to 1.2.

The second layer may contain O-rich SiON. Specifically, the first layer may include SiON having an O/Si molar ratio of 1.7 to 1.9.

That is, the first layer in direct contact with the color conversion layer 330 may contain N-rich SiON, and the second layer not in direct contact with the color conversion layer 330 may contain O-rich SiON. When the capping layer 400 includes SiON having different O/Si compositions, the efficiency of the color conversion panel may be increased.

In this case, the thickness of the first layer 410 including N-rich SiON may be 200 Å or less. When the thickness of the first layer 410 is 200 Å or more, the capping layer 400 may be separated due to film oxidation of the first layer 410, which is not preferable.

The thickness of the second layer 420 containing O-rich SiON may be greater than the first layer 410. For example, the thickness of the second layer 420 may be 2000 Å or more.

The thickness of the first layer 410 may be 5% to 20% of the thickness of the second layer 420. Although it will be described separately later, the first layer including N-rich SiON contributes to the efficiency improvement of the color conversion panel. However, if the thickness is greater than a certain thickness, the capping layer 400 may be separated due to oxidation of the film. That is, when the first layer 410 is less than 5% of the thickness of the second layer 420, the efficiency improvement effect of the color conversion panel of the capping layer 400 may be insignificant, and when the first layer 410 is more than 20% of the thickness of the second layer 420, the capping layer 400 may be separated due to the film oxidation of the first substrate 410.

Hereinafter, the effect of the present invention will be described.

Table 1 shows the efficiency and relative efficiency of each color conversion panel when SiON having various compositions is applied as a single layer.

SiON having different compositions were prepared, and the compositions of SiON used in each of Experimental Examples 1 to 3 are as follows.

TABLE 1

|  | Type | N1s | O1s | Si2p | O/Si |
|---|---|---|---|---|---|
| Experimental Example 1 | O-rich | 0.25 | 65.00 | 34.75 | 1.87 |
| Experimental Example 2 | O-rich | 0.47 | 64.76 | 34.77 | 1.86 |
| Experimental Example 3 | N-rich | 17.40 | 44.60 | 38.00 | 1.17 |

The efficiency was measured by applying SiON of Experimental Examples 1 to 3 having the composition as a single capping layer, and it is shown in Table 2.

TABLE 2

|  | Efficiency (cd %) | | | Efficiency relative comparison | | |
|---|---|---|---|---|---|---|
|  | R | G | B | R | G | B |
| Capping layer X (Ref) | 1.49% | 4.86% | 1.20% | 100% | 100% | 100% |
| Experimental Example 1 | 1.51% | 4.90% | 1.22% | 101% | 101% | 102% |
| Experimental Example 2 | 1.48 % | 4.71% | 1.20% | 99% | 97% | 100% |
| Experimental Example 3 | 1.44% | 5.23% | 1.21% | 98% | 108% | 101% |

Referring to Table 1 and Table 2, it was determined that the efficiency was the best when SiON of Experimental Example 3, of which an O/Si ratio was 1.17, was applied as the capping layer.

However, when SiON having the composition of Experimental Example 3 is applied as a capping layer, there is a problem in that stains occur on the entire surface of the display panel.

Table 3 below shows the efficiency measured by applying SiON of Experimental Examples 1 to 3 having the composition of the Table 1 as a single capping layer, and simultaneously shows the stain. The relative efficiency is shown by setting the efficiency in Experimental Example 1 as 100%.

TABLE 3

| | Efficiency relative comparison | | | | Stain/ |
| --- | --- | --- | --- | --- | --- |
| | R | G | B | Stain | Efficiency |
| Experimental Example 1 (Ref) | 100% | 100% | 100% | good | Ref |
| Experimental Example 2 | 100% | 100% | 99% | good | — |

TABLE 3-continued

| | Efficiency relative comparison | | | | Stain/ |
| --- | --- | --- | --- | --- | --- |
| | R | G | B | Stain | Efficiency |
| Experimental Example 3 | 105% | 103% | 99% | occurs in the entire surface | stain defect in the entire surface |

Referring to Table 3, it is preferable to apply SiON having the composition of Experimental Example 3 for maximum efficiency, but there was a problem in that stains were generated on the entire surface when SiON having the composition of Experimental Example 3 was applied alone, which was not preferable.

However, the color conversion panel according to the inventive concepts improved the occurrence of surface stains while securing maximum efficiency by forming SiON of different compositions into a multi-layer structure.

Specifically, SiON having the composition of Experimental Example 2 and SiON having the composition of Experimental Example 3 can be applied as a multi-layer structure. In this case, N-rich SiON (Experimental Example 3) is formed on the surface in contact with the color conversion layer, and O-rich SiON (Experimental Example 2) is formed on the surface not in contact with the color conversion layer. When the capping layer 400 is formed of a multi-layer structure of N-rich SiON and O-rich SiON, generation of stains can be prevented while efficiency is maximized.

Typically, hydrogen plasma treatment is used to improve the efficiency of the capping layer 400. However, according to the present embodiment, the capping layer 400 formed of a multi-layer structure of N-rich SiON and O-rich SiON can obtain high efficiency and improve the stain problem without hydrogen plasma treatment.

Table 4 below shows efficiency measurements and results for a case where the capping layer is a single layer and plasma is treated, and embodiments where the capping layer is formed in a multi-layer structure of N-rich SiON and O-rich SiON, and does not undergo plasma treatment.

In Table 4, plasma treatment conditions and times are shown. In embodiment 7, the thickness of each layer is described.

TABLE 4

| | Efficiency relative comparison | | | | |
| --- | --- | --- | --- | --- | --- |
| | R | G | B | Stain | Stain /efficiency |
| Embodiment 1 2Kw H$_2$ PT 5" + SiON 0.4 | 102% | 104% | 99% | good | efficiency increase R▲2%, G▲4% |
| Embodiment 2 4Kw H$_2$ PT 5" + SiON 0.4 | 102% | 105% | 100% | good | efficiency increase R▲2%, G▲5% |
| Embodiment 3 4Kw H$_2$ PT 10" + SiON 0.4 | 101% | 102% | 100% | good | efficiency increase R▲1%, G▲2% |
| Embodiment 4 2Kw H$_2$ PT 5" + SiON 0.5 | 101% | 102% | 99% | good | efficiency increase R▲1%, G▲2% |
| Embodiment 5 4Kw H$_2$ PT 5" + SiON 0.5 | 103% | 103% | 100% | good | efficiency increase R▲3%, G▲3% |
| Embodiment 6 4Kw H$_2$ PT 10" + SiON 0.5 | 98% | 102% | 99% | good | efficiency increase G▲2% |
| Embodiment 7 SiON 0.6 100 Å + SiON 0.5 (3900 Å) | 107% | 108% | 100% | good | efficiency increase R▲7%, G▲8% |

Referring to Table 4, it can be determined that efficiency improvement of Embodiment 7 in which the capping layer is multi-layered without plasma treatment is greater than in Embodiments 1 to 6 in which plasma treatment is performed.

Figure 3:
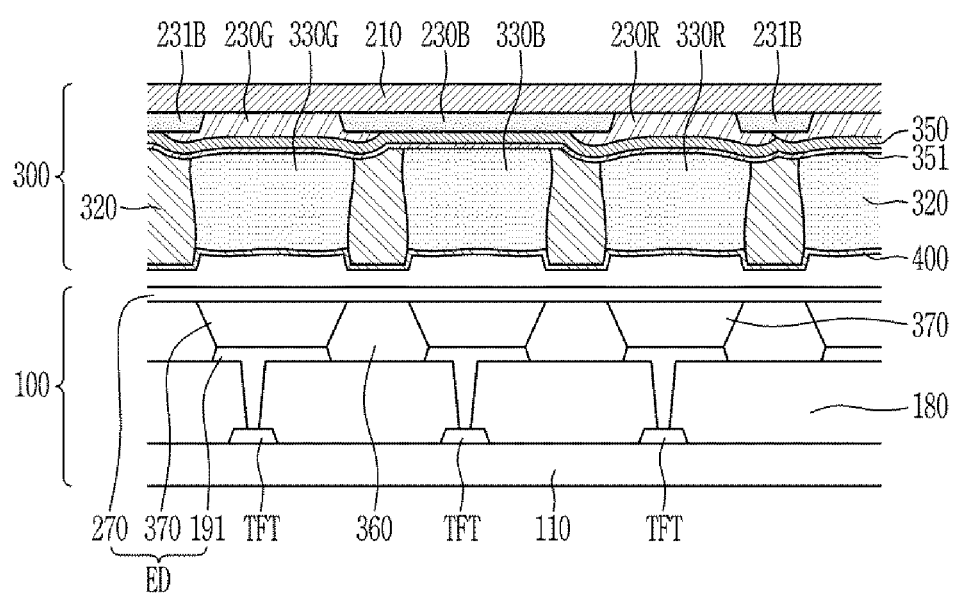
FIG. 3 illustrates a display device according to an embodiment.

Hereinafter, a display device including the color conversion panel 300 according to the present embodiment will be described with reference to FIG. 3. FIG. 3 illustrates a display device according to an embodiment.

FIG. 3 includes a display panel 100 and a color conversion panel 300. The display panel 100 includes a second substrate 110, a plurality of transistors TFT, and an insulating layer 180 disposed on the second substrate 110. A first electrode 191 and a partitioning wall 360 are disposed in the insulating layer 180, and the first electrode 191 is disposed in an opening of the partitioning wall 360 and is connected to the transistor TFT. Although not specifically illustrated, the transistor TFT may include a semiconductor layer, a source electrode, and a drain electrode connected to the semiconductor layer, and a gate electrode insulated from the semiconductor layer. A second electrode 270 is disposed on the partitioning wall 360, and a light emitting element layer 370 is disposed between the first electrode 191 and the second electrode 270. The first electrode 191, the second electrode 270, and the light emitting element layer 370 are collectively referred to as an emitting diode ED.

The color conversion panel 300 is the same as the color conversion panel of FIG. 1. A detailed description of the same constituent elements will be omitted. That is, a blue color filter 230B, a dummy color filter 231B, a red color filter 230R, and a green color filter 230G are disposed on the first substrate 210.

A low refractive layer 350 may be disposed on the color filters 230R, 230G, and 230B and the dummy color filter 231B. A low refractive capping layer 351 is disposed on the low refractive layer 350, and the red color conversion layer 330R, the green color conversion layer 330G, and the transmissive layer 330B may be disposed on the low refractive capping layer 351. The light blocking member 320 is disposed between the red color conversion layer 330R, the green color conversion layer 330G, and the transmissive layer 330B.

The light blocking member 320 of the color conversion panel 300 may overlap the partitioning wall 360 of the display panel 100 in a direction that is perpendicular to a plane of the first substrate 210. In addition, the red color conversion layer 330R, the green color conversion layer 330G, and the transmissive layer 330B may respectively overlap the emitting diode ED in the direction that is perpendicular to the plane of the first substrate 210.

As previously described, a capping layer 400 may be disposed on the red color conversion layer 330R, the green color conversion layer 330G, and the transmissive layer 330B.

The capping layer 400 may include SiON. More specifically, the capping layer 400 may have a multi-layer structure including SiON having different compositions.

Specifically, the capping layer 400 includes a first layer 410 and a second layer 420, and the first layer 410 may include N-rich SiON. Specifically, the first layer may include SiON having an O/Si ratio of 1.0 to 1.2. The second layer may contain O-rich SiON. Specifically, the second layer may include SiON having an O/Si ratio of 1.7 to 1.9.

The first layer 410 is disposed between the second layer 420 and the color conversion layer 330, and may directly contact the color conversion layer 330. The second layer 420 does not directly contact the color conversion layer 300, and is a region disposed on the outermost side of the color conversion panel 300.

As described, since the capping layer 400 is a multi-layer structure containing SiON having different compositions, it is possible to solve the problem of staining while maximizing the efficiency of the color conversion panel.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

<Description of symbols>

| | |
|---|---|
| 100: display panel | 300: color conversion panel |
| 110: second substrate | 210: first substrate |
| 320: light blocking member | 330B: transmissive layer |
| 330R: red color conversion layer | |
| 330G: green color conversion layer | |
| 360: partitioning wall | 350: low refractive layer |
| 400: capping layer | |

What is claimed is:

1. A color conversion panel comprising:
a first substrate;
light blocking members disposed on the first substrate, each of the light blocking members having a bottom surface facing the first substrate, the light blocking members being spaced apart from each other;
a first color conversion layer, a second color conversion layer, and a transmissive layer that are respectively disposed between the light blocking members; and
a capping layer disposed on the first color conversion layer, the second color conversion layer, and the transmissive layer, wherein
the capping layer is a multi-layer structure containing SiON having different compositions
the capping layer includes a second layer and a first layer disposed between the second layer and at least one of the first color conversion layer and the second color conversion layer,
the first layer contains SiON with an O/Si molar ratio of 1.0 to 1.2,
the second layer contains SiON with an O/Si molar ratio of 1.7 to 1.9, and
the first layer makes direct contact with at least one of the first color conversion layer and the second color conversion layer.

2. The color conversion panel of claim 1, wherein, in the first layer, a nitrogen (N) content and an oxygen (O) content are different from an N content and an O content of the second layer.

3. The color conversion panel of claim 1, wherein a nitrogen (N) content of the first layer is greater than that of the second layer.

4. The color conversion panel of claim 1, wherein an oxygen (O) content of the second layer is greater than that of the first layer.

5. The color conversion panel of claim 1, wherein a thickness of the first layer is less than that of the second layer.

6. The color conversion panel of claim 5, wherein a thickness of the first layer is 5% to 20% of a thickness of the second layer.

7. The color conversion panel of claim 1, wherein the first layer directly contacts the first color conversion layer, the second color conversion layer, and the transmissive layer.

8. The color conversion panel of claim 1, further comprising:
a first color filter disposed between the first substrate and the first color conversion layer;
a second color filter disposed between the first substrate and the second color conversion layer; and
a third color filter disposed between the first substrate and the transmissive layer.

9. The color conversion panel of claim 8, further comprising a dummy color filter disposed in a same layer as the third color filter, while overlapping the light blocking member in a direction that is perpendicular to a plane of the substrate,
wherein the third color filter and the dummy color filter are blue color filters.

10. The color conversion panel of claim 8, further comprising: a reflective layer disposed between the first color filter and the first color conversion layer.

11. The color conversion panel of claim 10, further comprising a refractive capping layer that contacts the reflective layer.

12. A display device comprising:
a color conversion panel; and
a display panel disposed while overlapping the color conversion panel,
wherein the color conversion panel comprises:
a first substrate;
light blocking members disposed on the first substrate, each of the light blocking members having a bottom surface facing the first substrate, the light blocking members being spaced apart from each other;

a first color conversion layer, a second color conversion layer, and a transmissive layer that are respectively disposed between the light blocking members; and a capping layer disposed on the first color conversion layer, the second color conversion layer, and the transmissive layer, wherein the capping layer has a multi-layered structure including SiON having different compositions, the capping layer includes a second layer and a first layer disposed between the second layer and at least one of the first color conversion layer and the second color conversion layer, the first layer contains SiON with an O/Si molar ratio of 1.0 to 1.2, the second layer contains SiON with an O/Si molar ratio of 1.7 to 1.9, and the first layer makes direct contact with at least one of the first color conversion layer and the second color conversion layer.

13. The display device of claim 12, wherein:

a nitrogen (N) content of the first layer is higher than that of the second layer; and an oxygen (O) content of the second layer is higher than that of the first layer.

14. The display device of claim 12, wherein a thickness of the first layer is 5% to 20% of a thickness of the second layer.

* * * * *